(12) United States Patent
Friestad et al.

(10) Patent No.: US 7,341,010 B1
(45) Date of Patent: Mar. 11, 2008

(54) SEED DISK DRIVE HUB

(75) Inventors: Michael Eric Friestad, Rock Island, IL (US); Gary Deloy Luxon, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/564,906

(22) Filed: Nov. 30, 2006

(51) Int. Cl.
*A01C 7/00* (2006.01)
*A01C 9/00* (2006.01)
*B60B 27/00* (2006.01)
*F16D 1/06* (2006.01)

(52) U.S. Cl. .......................................... 111/185; 403/1
(58) Field of Classification Search ................ 111/170, 111/177–185; 403/1
See application file for complete search history.

(56) References Cited

U.S. PATENT DOCUMENTS

| 3,732,896 A | * | 5/1973 | Jekl et al. ................... 139/436 |
| 4,294,408 A | * | 10/1981 | Snyder et al. ........... 239/218.5 |
| 6,758,153 B1 | | 7/2004 | Hagen et al. ................ 111/185 |

* cited by examiner

*Primary Examiner*—Christopher J. Novosad
(74) *Attorney, Agent, or Firm*—Taylor & Aust, P.C.

(57) ABSTRACT

A hub assembly for a seed disk has a conical surface that mates with a cylindrical edge on a hub portion of a seed disk to establish the concentricity of the two components. A pair of paddles on the hub are received in, and inter-fit with corresponding recesses on the seed disk to provide torque transmission. A retention element holds the two components together.

20 Claims, 7 Drawing Sheets

SEED DISK DRIVE HUB

FIELD OF THE INVENTION

The present invention relates to agricultural seeding machines, and, more particularly, to hubs for seed disks used to meter seeds for placement in a seed trench.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is moveably coupled with a tool bar. The frame may carry a main seed hopper, herbicide hopper and insecticide hopper. If a granular herbicide and insecticide are used, the metering mechanisms associated with dispensing the granular product into the seed trench are relatively simple. On the other hand, the mechanisms necessary to properly meter the seeds, dispense the seeds at a predetermined rate and place the seeds at predetermined relative locations within the seed trench are relatively complicated.

The mechanisms associated with metering and placing the seeds generally can be divided into a seed metering system and a seed placement system which are in communication with each other. The seed metering system receives the seeds in a bulk manner from the seed hopper carried by the frame. Different types of seed metering systems may be used such as seed plates, finger plates, and seed disks. In the case of a seed disk metering system, a seed disk is formed with a plurality of seed cells spaced about the periphery thereof. Seeds are moved into the seed cells, with one or more seeds in each seed cell depending upon the size and configuration of the seed cell. A vacuum or positive pressure air may be used in conjunction with the seed disk to assist in movement of the seeds into the seed cells. The seeds are singulated and discharged at a predetermined rate to the seed placement system.

The seed placement system may be categorized as a gravity drop system or a power drop system. In the case of a gravity drop system, a seed tube has an inlet end which is positioned below the seed metering system. The singulated seeds from the seed metering system merely drop into the seed tube and fall via gravitational force from a discharge end thereof into the seed trench. The seed tube may be curved in a rearward manner to assist in directing seed into the seed trench. The rearward curvature also assists in reducing bouncing of the seeds back and forth within the tube as it falls into the seed trench. Further, the rearward curvature reduces bouncing of the seed as it strikes the bottom of the seed trench.

A seed placement system of the power drop variety generally can be classified as a seed conveyor belt drop, rotary valve drop, chain drop or air drop. These types of seed placement systems provide more consistent placement of the seeds along a predetermined path at a desired spacing.

Certain seed types, notably flat corn seed with insecticide or other treatments, are difficult for vacuum meters to singulate. Poor singulation of difficult seed types is characterized by doubles, skips, and bunches of seed carried by the disk. Doubles and skips refer to multiple seeds and no seed respectively in each seed cell. Bunches are multiple seeds carried up by the seed pool accelerators which protrude from the surface of the seed disk. These seed types generally are best planted with a flat seed disk in combination with double eliminator. Compared to a celled disk, a flat disk has less favorable seed trajectory into the seed tube, generally requires more vacuum, and a production "double eliminator" adjustment is difficult.

The seed disk is an integral and key part of the seeding machine in that it performs the function of separating seeds into individual elements. It is therefore important that the seed disk be concentric with its drive mechanism that is journaled within the seeding machine. Manufacturing of the seed disk entails the establishment of tolerances for a multiplicity of surfaces which increases the cost of manufacturing and increases the probability of missed tolerances.

What is needed in the art is an effective hub for a seed metering disk that enables simplified and precise positioning.

SUMMARY OF THE INVENTION

The invention includes a drive hub for connecting a drive spindle to a seed disk. The drive hub includes a cylindrical element connected to one of the seed disk and drive spindle, the cylindrical element having a circular edge at one end thereof. A conical element is connected to the other of the seed disk and drive spindle. The conical element is received in the one end of the cylindrical element to pilot the conical element and cylindrical element relative to each other. The conical element and the cylindrical element inter-fit to transmit torque therebetween.

In another form the invention includes a seed metering assembly having a seed metering disk substantially circular and rotating about a central axis. A drive spindle is provided for the metering disk and is rotatable about the same axis. A drive hub connects the drive spindle to the seed disk and comprises a cylindrical element connected to one of the seed disk and drive spindle. The cylindrical element has a circular edge on one end thereof and a conical element connected to the other of the seed disk and drive element is received in the one end of the cylindrical element to pilot the conical element and cylindrical element relative to each other. The conical element and the cylindrical element inter-fit to transmit torque therebetween.

DETAILED DESCRIPTION OF THE INVENTION

Figure 1:
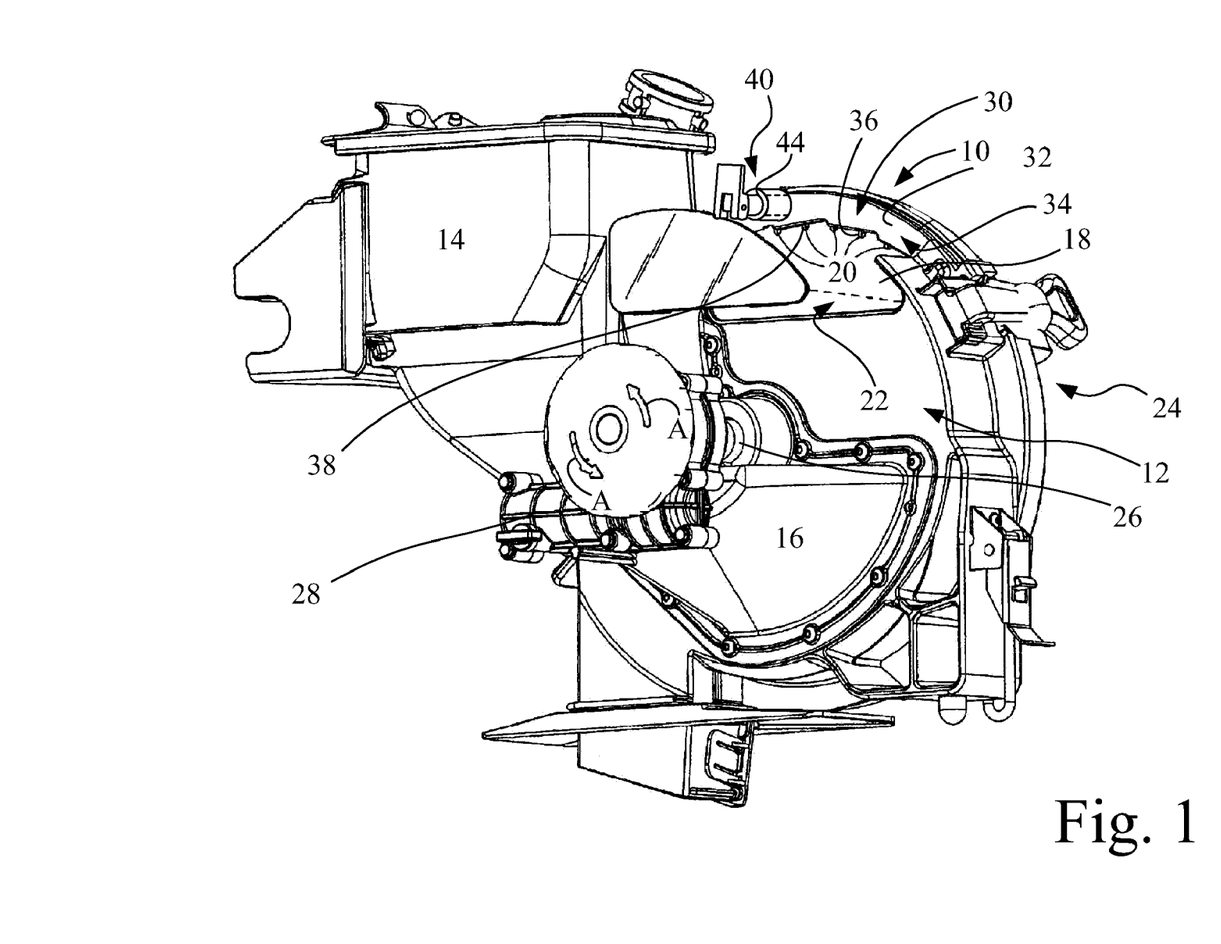
FIG. 1 is a perspective view of a seed metering machine.

Referring to FIG. 1, a seed meter, generally indicated by reference character 10, is incorporated in a seeding machine (not shown). The seeding machine has many additional features such as a main hopper or seed air pump to deliver seed to individual seed meters of which unit 10 is one of multiple units. Details of such an overall system may be found in U.S. Pat. No. 6,758,153, of common assignment with this invention, the disclosure of which is hereby incorporated in its entirety. The seed meter 10 includes a housing 12 and a seed hopper 14 which receives an appropriate supply of seeds from a main hopper (not shown). Seed hopper 14 delivers seeds to a chamber in a housing 16 at the lower portion of housing 12. A seed disk 18 is journaled in housing 12 and has a seed side 22 exposed to chamber 16 and a lower pressure side 24 exposed to a vacuum source for maintaining a pressure differential across seed disk 18. Seed disk 18 has a plurality of seed cells 20 positioned in a circular fashion around seed disk 18. Seed cells 20 may take many different forms, but in the illustrated form they are apertures extending through seed disk 18 to connect the seed side 22 to the lower pressure side 24. It should be understood by those skilled in the art that the pressure levels of sides 22 and 24 may be reversed.

Seed disk 18 is journaled on drive spindle 26 which is driven by an appropriate motor 28 through a gear mechanism (not shown) to turn the seed disk 18 in the direction of arrows A. The seeds that have accumulated against the bottom of seed disk 18 then find their way to the seed cells by virtue of the pressure differential across the seed disk. As the disk turns in a counterclockwise fashion, as shown in FIG. 1, the seeds that are in the seed cells are retained one at a time. The rotation of the disk takes the individual seeds to a segment (not shown) where the pressure differential is locally interrupted so that the seed may be discharged into an appropriate planting mechanism.

Seed disk 18 is connected to spindle 26 by a hub system generally indicated by reference character 30. It is necessary for the seed disk to be accurately positioned relative to the rotational axis of spindle 26, both from the standpoint of concentricity and an axial position relative to housing 12. In the past, the axial position and concentricity of such drive hubs have been established through a complex series of surfaces in which the run out has to be controlled within limits. Furthermore, since the drive hub transmits torque between the spindle 26 and the seed disk 18 provisions must be made for adequate torque transmittal.

Figure 2:
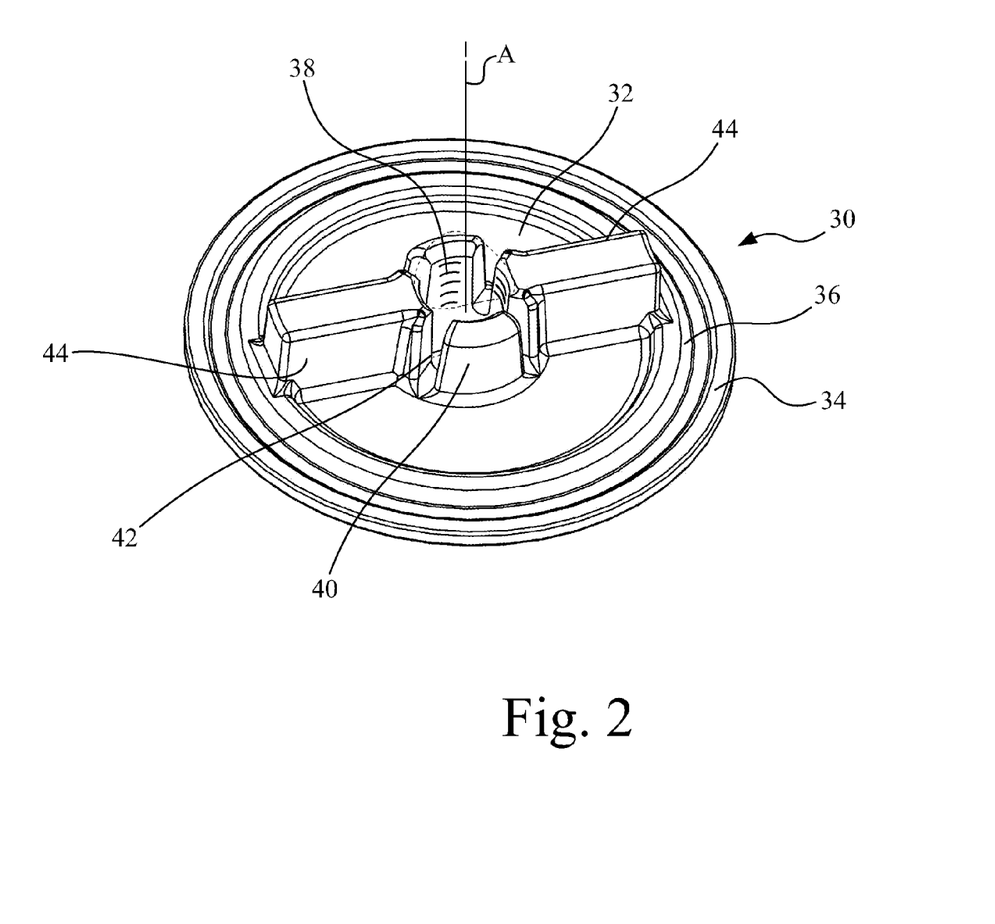
FIG. 2 is a perspective view of a drive hub used in the seed metering machine of FIG. 1.

As shown particularly in FIG. 2, the hub 30 has a flange 32 with an outer circumferential portion 34 that retains and supports a flexible annular sleeve, to be later described. Inboard of the outer circumferential section is a conical section 36 manufactured to be concentric with a rotational axis A of the hub 30. The hub 30 has a center through hole 38 which is threaded to receive the end of the drive spindle 26. The threaded hole 38 is retained within an annular section 40 having a plurality of notches 42 for an adjustment purpose, to be described later. Integral with the element 40, are a pair of radially extending paddles 44. Although a pair of paddles 44 is illustrated, it should be apparent to those skilled in the art that any number of paddles may be utilized.

Figure 3:
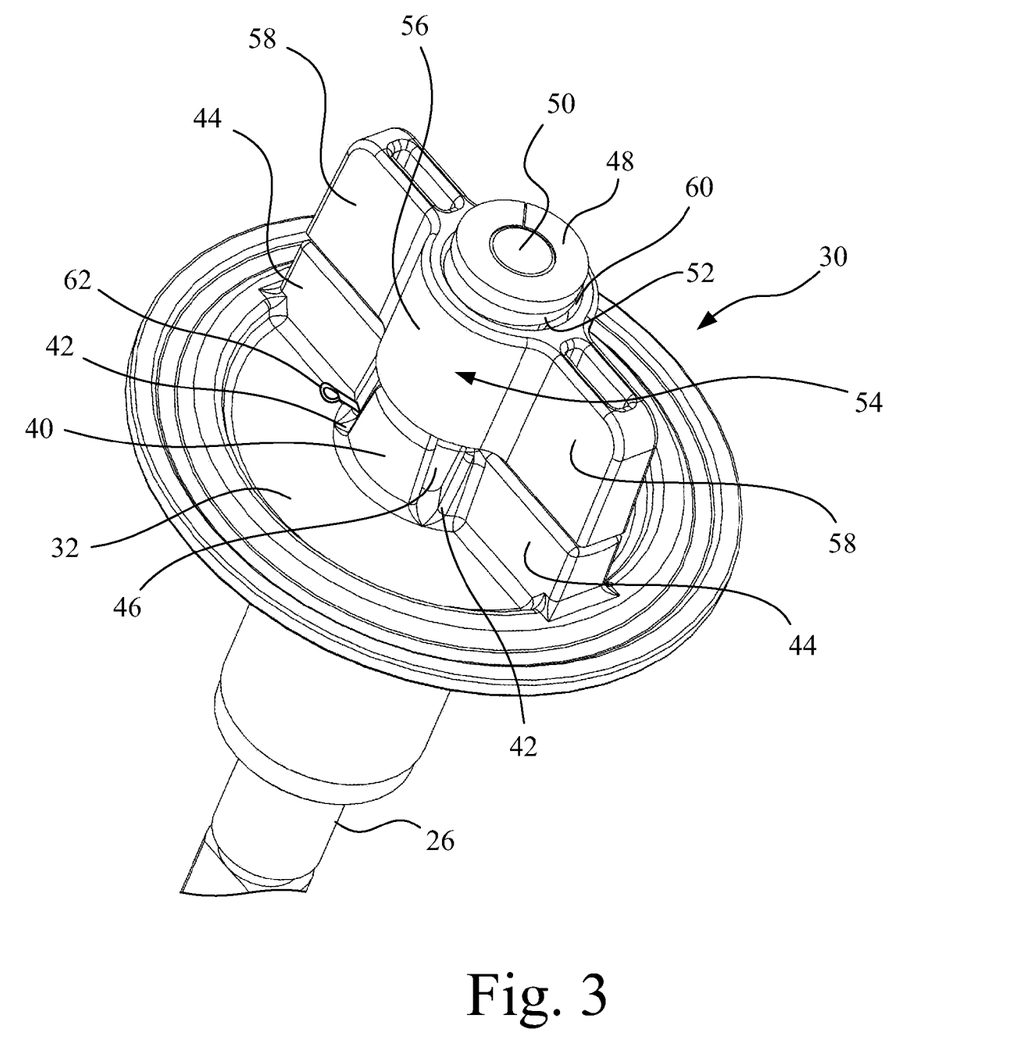
FIG. 3 is a perspective view of the drive hub of FIG. 2 in with a drive spindle and retention device.

FIG. 3 shows the hub 30 threaded onto the threaded end 46 of the spindle 26. A retaining collar 48 is threaded to the end 50 of spindle 26. End collar 48 is appropriately affixed to spindle 26 and acts as a stop for a spring 52, herein shown as a coil spring. The other end of spring 52 acts on a base wall (not shown) of a retention element 54 having a central hub 56 and a pair of radially extending tabs 58 which approximate in dimension the paddles 44. The spring 52 is retained within a recess 60 of hub 56. The resulting combination causes the retention element 54 to be yieldably urged towards the flange 32. The axial position of flange 32 and therefore the conical surface 36, relative to spindle 26, is set by the degree to which hub 40 is threaded over the threaded section 46. The threaded section 46 has a radial through passage (not shown) which receives a spring loaded key element 62 extending through recesses 42 to fix the relative threaded position of hub 40 on drive spindle 26.

Figure 4:
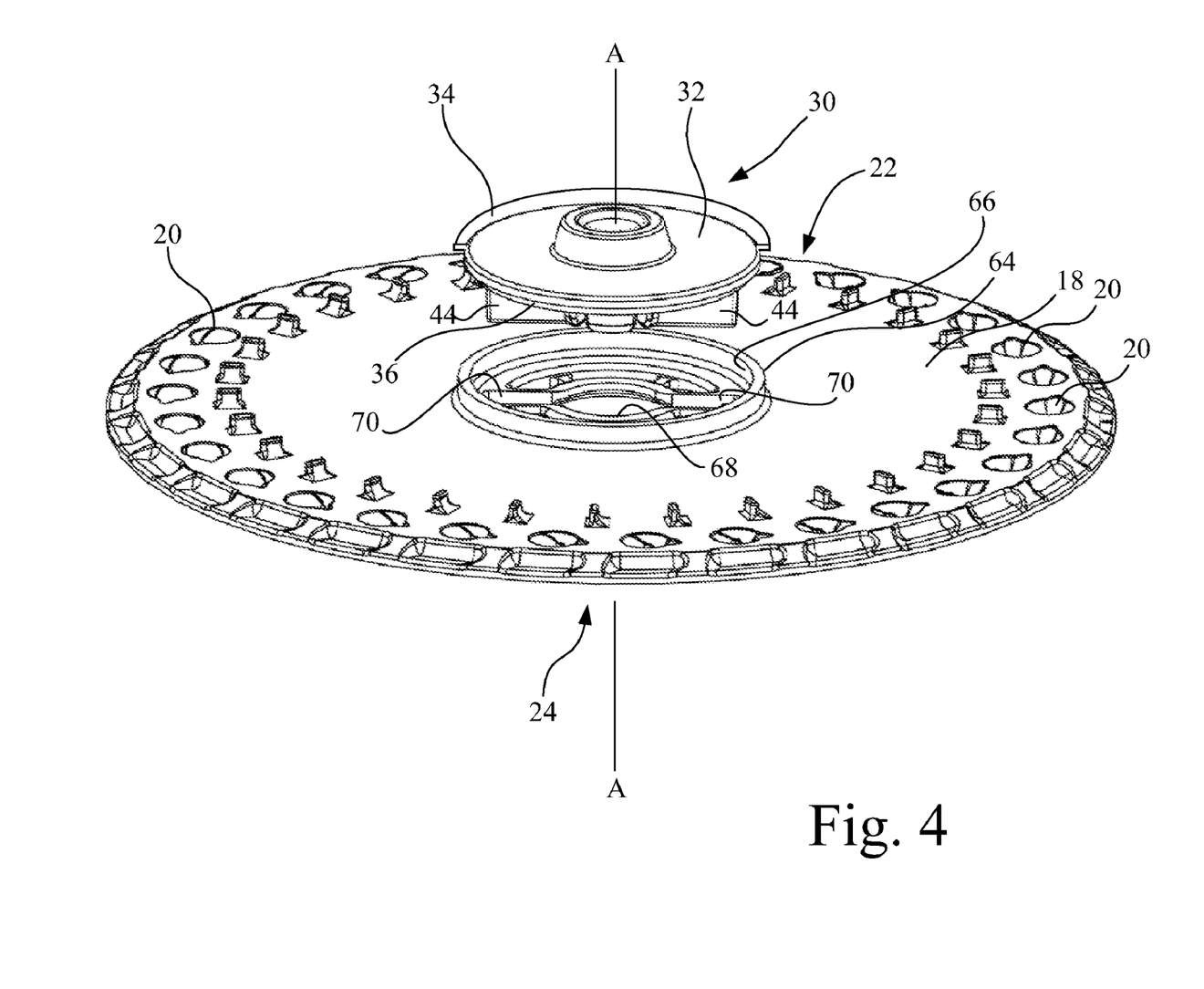
FIG. 4 is a perspective view of FIG. 2 and the seek disk of FIG. 1 showing a relative position for assembly.

FIG. 4 shows the interaction between the hub system 30 and the seed disk 18. Seed disk 18 has an inner cylindrical hub section 64 extending from the seed disk 18 towards the hub 30. Cylindrical section 64 has an inner end diameter 66 controlled to a given tolerance level with respect to the rotational axis A of the assembly. The circular edge of the end of diameter 66 is adapted to abut the conical surface 36 of hub 30 so that the two elements are concentric with respect to one another. Seed disk 18 also has a central opening 68 for accommodating the hub system 30 and a pair of radial slots 70 adapted to receive paddles 44.

Figure 5:
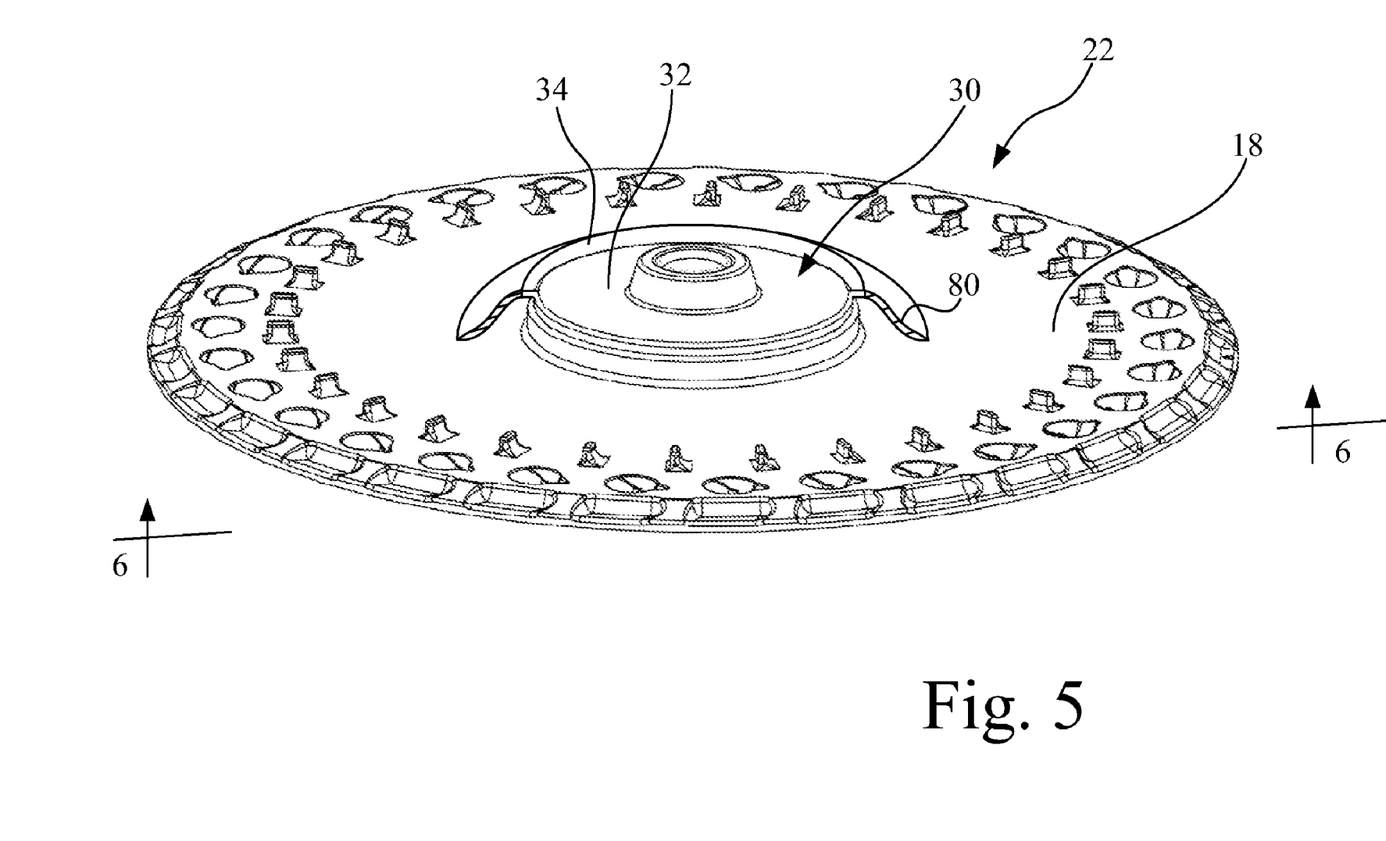
FIG. 5 is a perspective view of the hub of FIG. 2 and the seed disk of FIG. 1 in the installed position.
Figure 6:
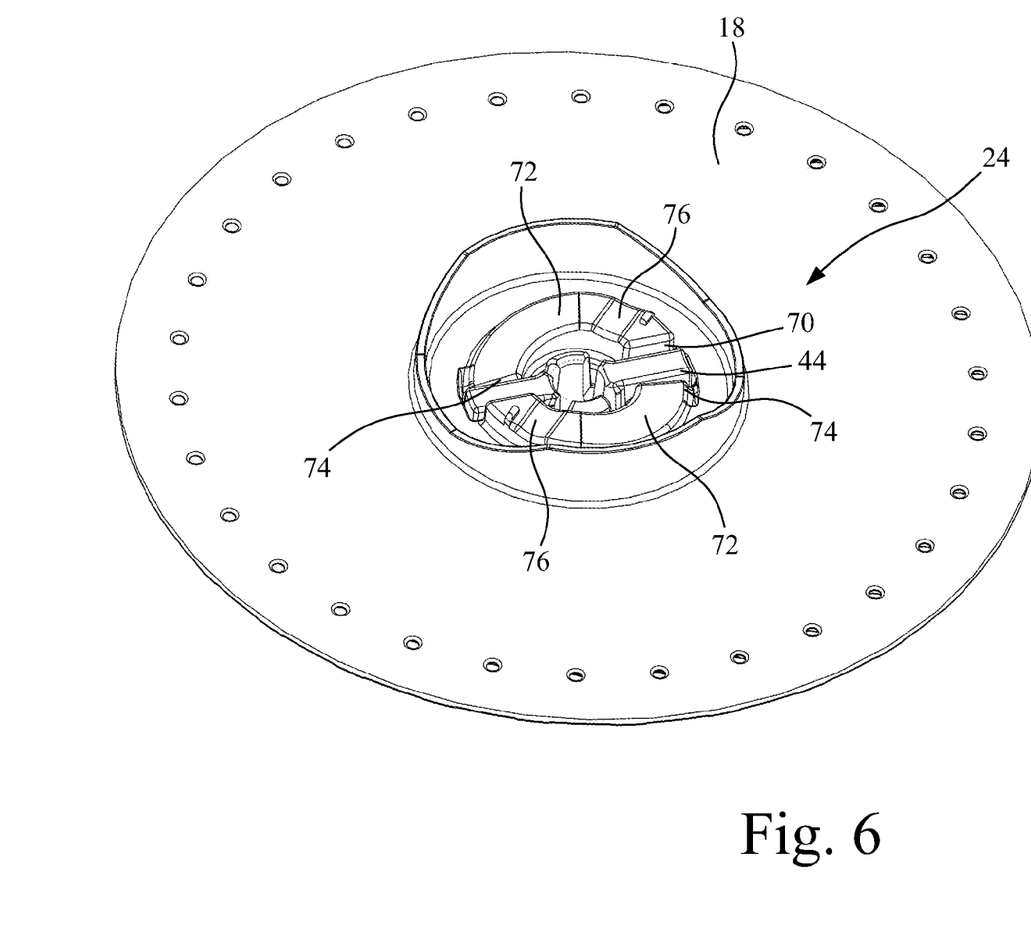
FIG. 6 is a perspective view of the assembled hub of FIG. 2 and disk of FIG. 1 without the spindle and associated elements taken on lines 6-6 of FIG. 5.

FIGS. 4, 5 and 6 show the hub assembly 30 without the spindle 26 and associated elements in order to more fully describe the invention. As shown in FIG. 5, the hub 30 is seated against seed disk 18 and FIG. 6 shows the opposite side 24 of seed disk 18. To further facilitate the explanation of the invention, the retaining element 54 is omitted. It can be seen that the paddles 44 extend through the recesses 70 to the side 24 of seed disk 18. In order to ensure that the retention assembly 54 holds or retains seed disk against the hub 30 a pair of ramps 72 extend through approximately little more than 90° arc. Ramps 72 each start out at a level at an end 74 that is approximately at the axial height of paddles 44 and extend upward to detents 76 at an elevated level to ensure that the retention element 54 remains in place.

Figure 7:
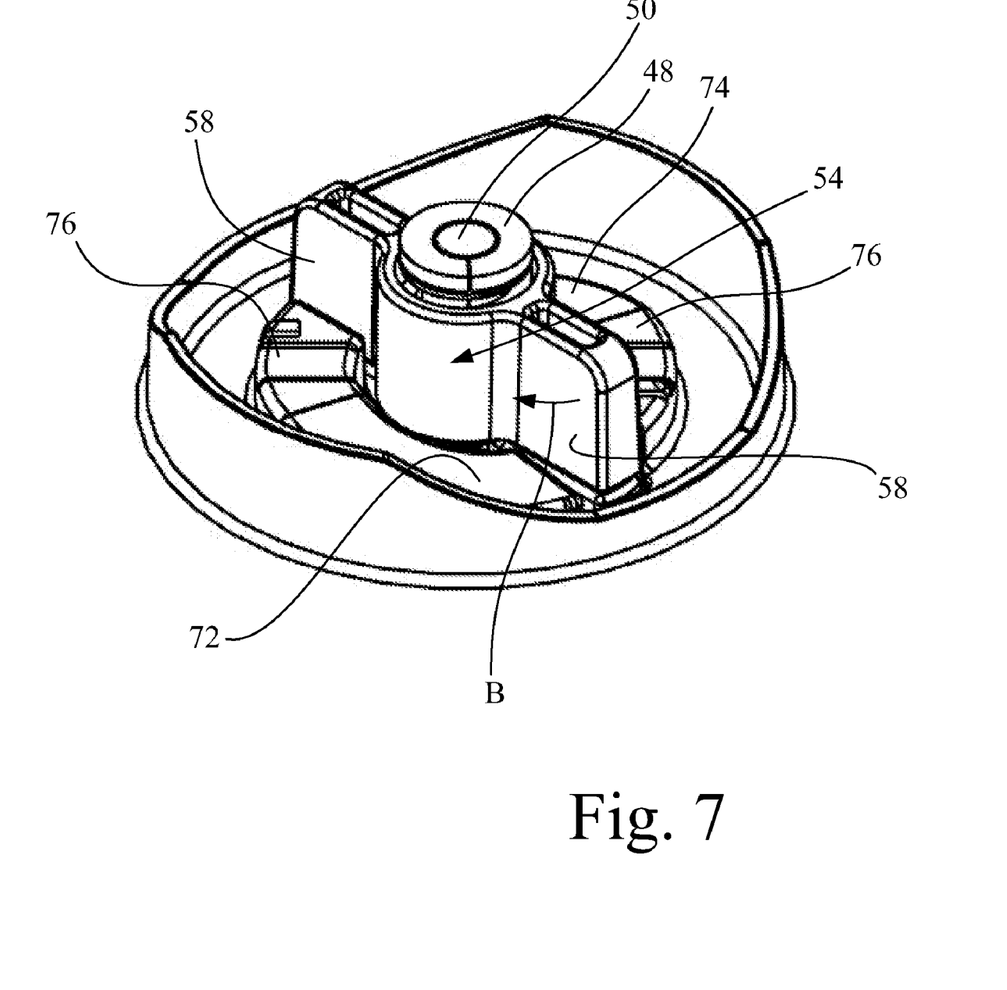
FIG. 7 is a partial perspective view of the hub of FIG. 2 and the disk of FIG. 1 showing a portion of the drive spindle assembly and associated elements.

FIG. 7 shows a partial view of FIG. 6 but with the spindle 26 and retention element 54 in place. It can be seen that after the hub 30 is inserted through seed disk 18 the tabs 58 clear the entry point of ramps 72 so that the tabs 58 can be rotated clockwise as shown by arrow B in FIG. 7 so that the tabs 58 are received and retained in detents 76. In this position the bottoms of tabs 58 act against the seed disk 18 to urge it against hub 30 by virtue of the spring element 52. Thus, the concentricity of the seed disk relative to the spindle is defined by the conical surface 36 and the cylindrical edge 66. Torque is transmitted between the hub 30 and the seed disk 18 through paddles 44 which interact with the walls of slots 70. Thus, the torque transmission is provided in a parallel path to the concentricity position of the assembly relative to the spindle 26.

The axial position of the seed disk of the hub 30, and therefore seed disk 18 relative to spindle 26 and housing 12, is adjusted by pulling out the pin 62 and threading the hub 40 in a clockwise or counterclockwise direction as needed to obtain the axial position. Once this established the pin 62 is inserted through the nearest slot 42 through the radial passage in the threaded section 46 of spindle 26.

In order to provide a seal between the hub 30 and seed disk 18, a conical, resilient, seal element 80 (shown partially cut away) is affixed to flange 34 of hub 30. Seal 80 ensures that an adequate pressure differential is maintained across the seed disk 18 and that no significant leakage passes through the interconnected hub and seed disk.

Thus it is seen that the concentricity of the hub relative to the spindle is determined by several key dimensions rather than a multiplicity of dimensions as done in the past Having described the preferred embodiment, it will become apparent that various modifications can be made without departing from the scope of the invention as defined in the accompanying claims.

The invention claimed is:

1. A drive hub for connecting a drive spindle to a seed disk, said drive hub comprising:
   a cylindrical element connected to one of the seed disk and drive spindle, said cylindrical element having a circular edge at one end thereof;
   a conical element connected to the other of the seed disk and drive spindle, said conical element being received in the said one end of said cylindrical element to pilot the conical element and cylindrical element relative to each other, said conical element and said cylindrical element inter-fitting to transmit torque therebetween.

2. A drive hub as claimed in claim 1, wherein said torque transmission between said cylindrical element and said conical element is independent of the pilot therebetween.

3. A drive hub as claimed in claim 2, wherein said torque transmission is provided by at least one paddle element extending radially with respect to one of said conical element and said cylindrical element, the other of said conical element and said cylindrical element having a corresponding radial slot for receiving said paddle element.

4. A drive hub as claimed in claim 3, wherein said conical element and said cylindrical element are axially fixed relative to one another.

5. A drive hub as claimed in claim 4, wherein the element having said paddle has a tab in line with said paddle for insertion through said slot to the opposite side of the other of said conical element and said cylindrical element for pivotal rotation to restrain said cylindrical element relative to said conical element.

6. A drive hub as claimed in claim 5, wherein said tab urges said cylindrical element and said conical element towards one another.

7. A drive hub as claimed in claim 3, further comprising a flexible seal on one of said conical element and said cylindrical element for pressing against said seed disk.

8. A drive hub as claimed in claim 3, wherein said conical element has a central opening and has internal threads for engaging external threads on said drive spindle.

9. A drive hub as claimed in claim 1, wherein said cylindrical element is integral with said seed disk.

10. A seed metering assembly comprising:
    a seed metering disk substantially circular and rotating about a central axis;
    a drive spindle for said metering disk, said drive spindle being rotatable about an axis; and
    a drive hub for connecting said drive spindle to said seed disk comprising a cylindrical element connected to one of the seed disk and drive spindle, said cylindrical element having a circular edge at one end thereof, and a conical element connected to the other of the seed disk and drive spindle, said conical element being received in the said one end of said cylindrical element, to pilot the conical element and cylindrical element relative to each other, said conical element and said cylindrical element inter-fitting to transmit torque therebetween.

11. A seed metering disk assembly as claimed in claim 10, wherein the torque transmission is independent of said pilot interaction.

12. A seed metering disk assembly as claimed in claim 11, wherein one of said conical element and said cylindrical element has at least one paddle extending radially relative thereto, the other of said conical element and said cylindrical element having at least one radial slot receiving said paddle for transmitting torque.

13. A seed metering disk assembly as claimed in claim 12, wherein one of said conical element and said cylindrical element is integral with said seed disk.

14. A seed metering disk assembly as claimed in claim 13, wherein said conical element and said cylindrical element are restrained axially with respect to each other.

15. A seed metering disk assembly as claimed in claim 14, wherein the element having said paddle has a tab extending radially therefrom and inline with said paddle, said tab being insertable through said radial slot and pivotal to restrain said cylindrical element relative to said conical element.

16. A seed metering disk assembly as claimed in claim 15, wherein the element receiving said tab has a ramp which is traversed by said tab to an elevated position for restraining of said conical element and said cylindrical element relative to one another.

17. A seed metering disk assembly as claimed in claim 16, wherein the element receiving said tab has a detent in an elevated position for retaining said tab.

18. A seed metering disk assembly as claimed in claim 17, wherein said tab is yieldably urged towards said detent.

19. A seed metering disk assembly as claimed in claim 18, wherein said drive spindle has a flange retaining a substantially coaxial spring, said spring urging said tab toward said detent.

20. A seed metering disk assembly as claimed in claim 14, wherein said cylindrical element is integral with said seed disk and said conical element has a yieldable flexible conical seal element for abutting and sealing against said seed disk.

* * * * *